March 12, 1968     O. E. LIDDELL     3,372,552
WOODEN FENDER PILE PROTECTING APPARATUS
Filed Feb. 23, 1967
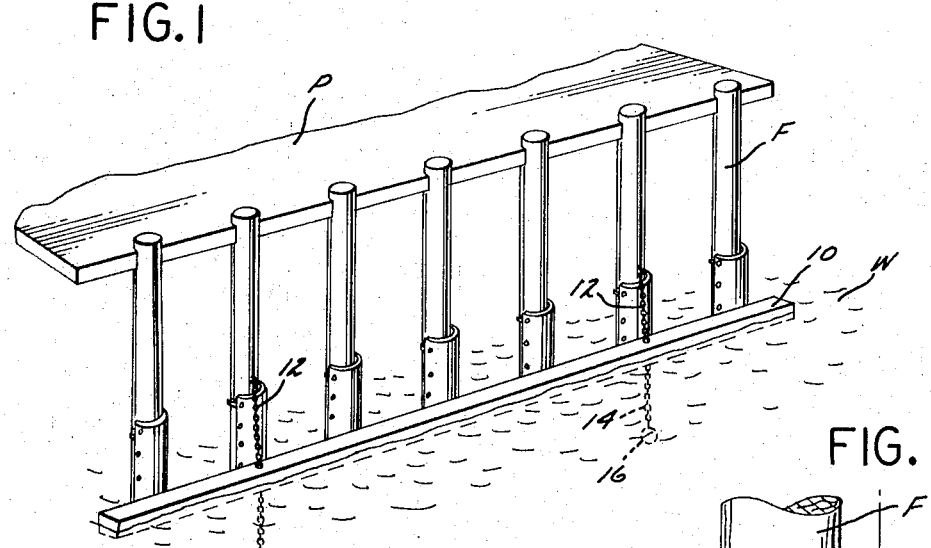
FIG.1
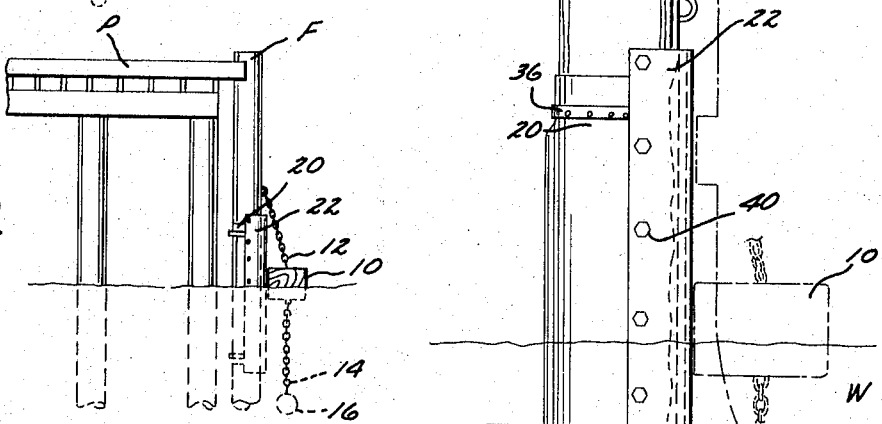
FIG.2     FIG.3
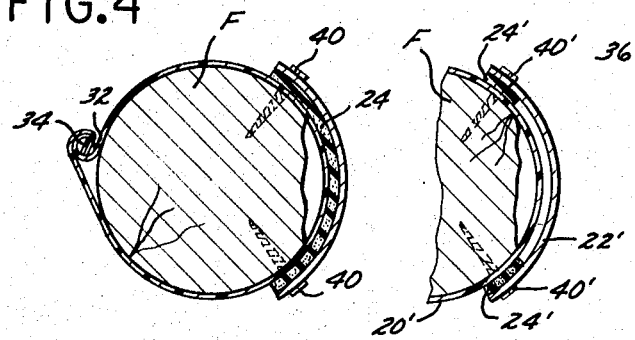
FIG.4
FIG.5
INVENTOR.
ORVAL E. LIDDELL
BY *Fulwider, Patton, Rieber, Lee and Utecht*
ATTORNEYS

United States Patent Office 3,372,552
Patented Mar. 12, 1968

3,372,552
WOODEN FENDER PILE PROTECTING APPARATUS
Orval E. Liddell, P.O. Box 1533, Avalon, Calif. 90704
Substituted for abandoned application Ser. No. 348,569, Mar. 2, 1964. This application Feb. 23, 1967, Ser. No. 642,258
2 Claims. (Cl. 61—54)

ABSTRACT OF THE DISCLOSURE

Apparatus usable with a floating bumper to protect wooden fender piling against marine borer attack and also against mechanical destruction utilizing a sheet of substantially waterproof material wrapped about the pile to define a generally circumferential water-filled space between the pile and the sheet, with circulation between such space and the ambient water being restricted to thereby maintain the water in the space stagnant and prevent marine borer attack on the submerged portion of the pile encased by the sheet. A rigid shoe of arcuate shape is disposed on the side of the fender pile facing a floating bumper exterior of the sheet. A resilient cushion membrane is interposed between the concave side of the shoe and the sheet. The shoe is held in place by lag bolts that extend through the shoe and cushion membrane into the fender pile with the cushion membrane providing a water seal between the lag bolts and the sheet and also absorbing mechanical impacts when a ship engages the floating bumper.

Brief summary of the invention

Most larger pier structures are provided with vertically extending wooden fender piles along their outer edge. Such wooden fender piles cooperate with one or more floating bumper members, commonly termed "fender logs," to protect the pier against damage from the impact of ships. The floating bumpers distribute the impact load from a ship to the fender piles along the full length of the bumpers. The bumpers rise and fall with the tide and wave action so as to gradually erode the outer surface of the fender piles until the usual creosote protection has been penetrated. Many piers do not have fender logs and erosion and damage is caused by direct contact between the ship and fender pile.

Once penetration of the fender piles is effected the untreated wood is subject to active marine borer attack. Such marine borer attack, together with the mechanical destruction resulting from the impact of ships with the floating bumper, or ship impact directly against the pile where fender logs are not provided, relatively quickly destroys the fender piles requiring the replacement thereof. Such replacement is expensive, particularly since it requires that the dock be kept out of service during the replacement process.

The apparatus of the present invention protects the fender piles against both mechanical destruction and destruction from marine borers. This is accomplished by providing a sheet of substantially waterproof material that is wrapped about the fender pile to create a stagnant water space next to the pile wherein circulation is restricted so as to restrict the circulation of sea water around the fender pile to such an extent that salt, oxygen and organic matter which the borers extract from the sea to sustain themselves are not supplied at a sufficiently high rate to maintain the life of such borers. A rigid shoe of arcuate shape is disposed on the side of the fender pile facing the floating bumper and cushion membrane means of resilient material is interposed between the concave side of the shoe and the proximate side of the sheet. Elongated securing means are extended radially inwardly through the shoe and the sheet into the fender pile to hold the shoe to the fender pile, with the cushion membrane means providing a water seal between the securement means and the material of the sheet and also absorbing mechanical impacts when the floating bumper is engaged by ships.

Description of the prior art

Applicant is aware of the following prior art patents: Bedbury et al., 468,291; Gorrow, 2,897,553; Johnson, 2,928,411; Liddell, 3,027,610; Liddell, 3,139,731.

Brief description of the drawings

FIG. 1 is a perspective view showing a pier provided with apparatus embodying the present invention;

FIG. 2 is a side elevational view of the pier of FIG. 1;

FIG. 3 is a fragmentary side elevational view in enlarged scale and taken partly in central vertical section showing said apparatus;

FIG. 4 is a horizontal sectional view taken along the line 4—4 of FIG. 3; and

FIG. 5 is a fragmentary horizontal sectional view corresponding to FIG. 4 but showing a second form of apparatus embodying said invention.

Detailed description of the preferred embodiments

Referring to the drawings and particularly FIGS. 1 and 2 thereof, there is shown a conventional pier P that is provided along one of its outer sides with a plurality of vertically extending wooden fender piles F partially submerged in sea water W. One or more elongated wooden floating bumpers or "fender logs" 10 are positioned adjacent the outwardly facing sides of the fender piles F. In one typical design, each floating bumper 10 is shown held in place against the fender piles F by means of a chain 14 passing through a hole in the bumper 10, the upper end being affixed to the fender pile F, while the lower end of the chain is provided with a weight 16. Other methods, using cables, rubber straps and other attachments can also be used to hold the floating bumper against the fender piles during the rise and fall of the tides.

A preferred form of apparatus embodying the present invention is shown positioned upon the fender piles F and includes a barrier sheet 20 wrapped about the fender pile F, a rigid shoe 22 disposed on the side of the fender pile F facing the floating bumpers 10, a cushion membrane member 24 that is interposed between the shoe 22 and the proximate side of the sheet 20, and suitable means for securing the aforementioned members in place upon the fender pile F.

The sheet 20 is substantially rectangular and is of pliable, preferably waterproof material. Several synthetic plastics have proven satisfactory, as for example polyvinyl chloride. Alternatively, the sheet 20 may be formed of rubber, neoprene, a woven fabric or other synthetic sheet material. The sheet 20 should be "substantially waterproof" in the sense that while it may be porous the ratio of volume of pores or interstices to the volume of mass restricts the circulation of sea water around the enclosed fender pile F to such an extent that the rate of circulation is less than that required to sustain marine borer life. When the salt, oxygen and organic matter which the borers extract from the sea to sustain themselves are not supplied at a sufficiently high rate, the borers die as a consequence. The extent to which the rate of circulation must be restricted will vary according to the type of borer, the salt, oxygen and organic matter content of the sea water and other local conditions and is therefore subject to many variables.

The length of the sheet 20 is sufficient to cover the submerged height of the fender pile F subject to marine borer attack. The sheet 20 has a width throughout its length exceeding the corresponding circumference of the fender pile. The vertical edges of the sheet 20 are stiffened or rigidly reinforced against bending by a pair of vertically extending pole pieces, designated 32 and 34. Both of the pole pieces 32 and 34 are semicylindrical and are formed of wood, metal, synthetic plastic or the like. The flat side of each pole piece is rigidly affixed as by cement to its respective vertical edge of the sheet 20. The pole pieces need not extend the full length of the sheet 20, as indicated particularly in FIG. 3.

The pole pieces 32 and 34 permit the sheet 20 to be readily manipulated for placement around the fender pile F. Thus, as indicated in FIGS. 3 and 4, the flat sides of the pole pieces are brought together to define a substantially cylindrical unit whereafter the pole pieces are rotated as such a unit so as to contract the sheet 20 into close proximity with the pile F. The pole pieces are then secured to the pile F by suitable means, such as lag bolts. A more detailed description with respect to the use of such pole pieces to position the sheet 20 is set forth in my Patent No. 3,027,610, issued Apr. 3, 1962 and my Patent No. 3,139,731, issued June 7, 1964 on patent application Ser. No. 785,085, filed Jan. 5, 1959.

As indicated in FIG. 3, the upper and lower edges of the barrier sheet 20 are attached to the fender pile F by means of suitable bands 36. In this manner an effective seal is provided between each fender F and the barrier sheet 20 suitable to control the flow of water between the ambient freely circulating water W surrounding each fender pile F and the water contained within the generally circumferential space between the exterior of each pile F and the interior of the sheet 20. Generally, it is not essential that this seal be absolutely water tight. It should, however, be sufficiently water tight to restrict the flow of ambient water to a rate insufficient for supporting marine borer life within the aforementioned generally circumferential space. If desired, the upper and/or lower portion of each barrier sheet 20 may be sealed by the use of means disclosed in my co-pending application, Ser. No. 186,603, filed Mar. 29, 1962, now Patent No. 3,177,667 issued April 13, 1965.

The rigid shoe 22 is formed of a suitable metal synthetic plastic, fiber or the like. It is arcuately shaped to generally fit the curvature of the fender pile F. These shoes 22 may be in modular units such as, for example, six to eight feet in length so as to expedite handling at the pier site. It is possible to provide portable metal rolling equipment at the pier site so as to provide shoe curvature to snugly fit the pile and thus expedite the installation of the apparatus on the pier to be protected.

The cushion membrane member 24 may be formed of a flat pad of any suitable resilient material, such as natural or synthetic plastic either solid or cellular in composition. Such material should provide high crush and impact strength and be immune both to water and corrosive action. In the form of the invention shown in FIG. 4 the cushion pad 24 has substantially the same overall dimensions as the rigid shoe 22.

Each shoe 22 is secured to the fender pile F by means such as a plurality of lag bolts 40. Alternate fastening means could be bolts, spikes, screws or bands. As shown particularly in FIG. 4, the lag bolts 40 extend radially inwardly through the shoe 22 and cushion membrane 24 into the material of the fender pile F. It should be particularly noted that with this arrangement, the cushion membrane material provides an effective water seal between the lag screws 40 and the material of the barrier sheet 20.

Referring now to FIG. 5, there is shown an alternative embodiment of the apparatus of the present invention wherein the cushion membrane member 24' takes the form of a pair of vertically extending strips rather than a pad of material, as in the case of the embodiment of FIG. 4. Individual disks or washers could likewise be utilized under each bolt location.

It should be particularly noted that both forms of the present invention described hereinbefore are usable with fender piles which have already been partially eaten away by marine borers since once the barrier sheet 20 has been applied, further damage from marine borers will be positively prevented. The apparatus of the present invention is also usable with newly-installed fender piles. It is not necessary that such new fender piles be treated with creosote or the like inasmuch as the barrier sheet 20 will prevent any marine borer attack even to bare wood. It is not necessary to take the pier out of service when the apparatus of the present invention is being installed. An important feature of the present invention is that the rigid shoe 22 serves to add stiffness to the fender piles and will thereby extend the service life of the fender pile, even where the fender piles are subjected to very heavy ship impact. The shock of such impact is of course cushioned by the cushion membrane 24 or 24'.

The apparatus of the present invention is also usable without the floating bumpers 10. As so used the rigid shoe 22 prevents direct rubbing contact between floating vessels and the fender piles F.

Various modifications and changes may be made with respect to the foregoing detailed description without departing from the spirit of the present invention or the scope of the following claims.

I claim:

1. Apparatus usable with a floating bumper for protecting a partially submerged wooden fender pile against marine borer attack and also against mechanical destruction, comprising:

a sheet of substantially waterproof material wrapped about said pile;

fastening means interposed between said pile and said sheet whereby said sheet defines a generally circumferentially water-filled space between said pile and said sheet, with circulation between said space and the water surrounding said space being restricted to thereby maintain the water in said space stagnant to prevent marine borer attack on the submerged portion of said pile encased by said sheet;

a rigid shoe of arcuate shape generally corresponding to the shape of said pile disposed on the side of said pile facing said floating bumper radially outwardly of said sheet;

cushion membrane means of resilient material interposed between the concave side of said shoe and the proximate side of said sheet;

and elongated securement means extending radially inwardly through said shoe through said sheet, and through said cushion membrane means into the material of said pile, with said cushion membrane means providing a water seal between said securement means and the material of said sheet.

2. Apparatus as set forth in claim 1 wherein said securement means comprises a plurality of lag bolts.

References Cited

UNITED STATES PATENTS

| | | | |
|---|---|---|---|
| 468,291 | 2/1892 | Bedbury et al. | 52—728 X |
| 2,897,553 | 8/1959 | Gorrow | 52—728 X |
| 2,928,411 | 3/1960 | Johnson | 61—54 X |
| 3,027,610 | 4/1962 | Liddell | 61—54 X |

JACOB SHAPIRO, *Primary Examiner.*